United States Patent [19]

Ito

[11] Patent Number: 4,856,333

[45] Date of Patent: Aug. 15, 1989

[54] SERVO TYPE ACCELEROMETER

[75] Inventor: Akio Ito, Konosu, Japan

[73] Assignee: Jeco Company Limited, Gyoda, Japan

[21] Appl. No.: 135,112

[22] Filed: Dec. 18, 1987

[30] Foreign Application Priority Data

Dec. 27, 1986 [JP] Japan .................................. 61-313583

[51] Int. Cl.$^4$ ........................................... G01A 15/13
[52] U.S. Cl. ................................................. 73/517 B
[58] Field of Search ......................... 73/517 B, 517 R; 250/231 R

[56] References Cited

U.S. PATENT DOCUMENTS

| | | | |
|---|---|---|---|
| 2,947,176 | 8/1960 | Perry | 73/517 B |
| 2,995,935 | 8/1961 | Eyestone et al. | 73/517 B |
| 3,897,690 | 8/1975 | Hanson | 73/517 B |
| 4,507,965 | 4/1985 | Stratton et al. | 73/517 B |
| 4,598,586 | 7/1986 | Danielson | 73/517 B |
| 4,649,748 | 3/1987 | Fukano et al. | 73/517 B |

FOREIGN PATENT DOCUMENTS 58-90111 5/1983 Japan .

Primary Examiner—John Chapman
Attorney, Agent, or Firm—Pennie & Edmonds

[57] ABSTRACT

A servo type accelerometer comprises a photoelectric element which is made of a single packaged element and has two separated photoelectric parts, a light-emitting element opposite to the photoelectric element, a pendulum having a member for limiting an optical path of light emitted by the light-emitting element, the member being arranged between the photoelectric element and the light-emitting element, and a frame for supporting the pendulum. The accelerometer further comprises a detection unit for detecting a rotational displacement of the pendulum corresponding to acceleration by use of output signals of the photoelectric parts to produce a detection signal corresponding to the rotational displacement, and torque generating unit for generating a torque corresponding to the detection signal to drive the pendulum towards its original position.

14 Claims, 3 Drawing Sheets

SERVO TYPE ACCELEROMETER

BACKGROUND OF THE INVENTION

The present invention generally relates to servo type accelerometers for detecting acceleration, and in particular to a servo type accelerometer in which a pendulum is servo-controlled by a torque generating unit in which a current corresponding to acceleration is supplied to a coil which is a part of the torque generating unit.

Currently, accelerometers for detecting the presence or quantity of acceleration are widely used in various fields such as automobiles and navigation systems.

For example, the Japanese Laid-Open Patent Application No. 90111/1983 discloses a servo type accelerometer. This type of accelerometers detects a rotational displacement of a pendulum proportional to the acceleration, and provides a current corresponding to the detected displacement with a coil which constitutes the torque generating unit together with a pole piece (yoke). A torque produced by the coil is exerted on the pendulum to drive it toward its original position where there is no accelerationl. The amount of the current flowing in the coil corresponds to the acceleration. The displacement of the pendulum is detected by a displacement detecting unit including one light-emitting element and two mutually independent photoelectric elements. A light interrupting member is provided between the light-emitting element and the photoelectric elements. The light interrupting member of the pendulum deviates from its original position as a function of the acceleration. Therefore, a difference between outputs of the two photoelectric elements corresponds to the acceleration. It should be noted that there is the requirement of employing two photoelectric elements having almost the same characteristics relating to the light sensitivity, leakage current, temperature and the like.

However, the above accelerometer has the following disadvantages. The accelerometer employs two independent photoelectric elements. That is, each of the two photoelectric elements has a photoelectric part which is packaged. In general, the possibility that two photoelectric elements which are arbitrarily selected from among a number of elements have almost the same characteristics is very rare. In most cases, two arbitrarily selected photoelectric elements are considerably different from each other in characteristics such as photo sensitivity, temperature, leakage current and so on. Especially, the temperature characteristics are extremely different, depending on the photoelectric elements. Therefore, various adjustments on the displacement detecting unit are required at the time of assembly. In addition, the acceleration detecting properties of the displacement detecting unit is degraded as time elapses.

In addition, the torque generating unit of the conventional servo type accelerometer uses the pole piece (yoke) of a cylindrical shape. Therefore, it is very difficult to constitute the servo type accelerometer of a compact size, especially, a thin accelerometer.

Moreover, the conventional accelerometer employs two sets of torque generating units to balance the pendulum. For this reason, the assembly and adjustment operation are complicated.

SUMMARY OF THE INVENTION

Accordingly, a general object of the present invention is to provide a novel and useful servo type accelerometer in which the disadvantages of the conventional servo type accelerometer have been eliminated.

A more specific object of the present invention is to provide a servo type accelerometer in which adjustment of the accelerometer are very simple and easy.

Another object of the present invention is to provide a servo type accelerometer of a compact and thin size.

Still another object of the present invention is to provide a servo type accelerometer which is stable against temperature variations.

A further object of the present invention is to provide a servo type accelerometer which is economic and reliable.

The above objects of the present invention can be attained by a servo type accelerometer that comprises a photoelectric element which is made of a single element and has two separated photoelectric parts, a light-emitting element opposite to the photoelectric element, a pendulum having a member for limiting an optical path of light emitted by the light-emitting element, the member being arranged between the photoelectric element and the light-emitting element, and a frame for supporting the pendulum. The accelerometer further comprises a detection unit for detecting a rotational displacement of the pendulum corresponding to acceleration by use of output signals of the photoelectric parts to produce a detection signal corresponding to the rotational displacement, and torque generating unit for generating a torque corresponding to the detection signal to drive the pendulum towards its original position.

Other objects and features of the present invention will be apparent from the following detailed description when read in conjunction with the attached drawings.

DETAILED DESCRIPTION

A description will be given on a first embodiment of an accelerometer of the present invention with reference to FIGS. 1A through 1C and FIG. 2.

Figure 1A:
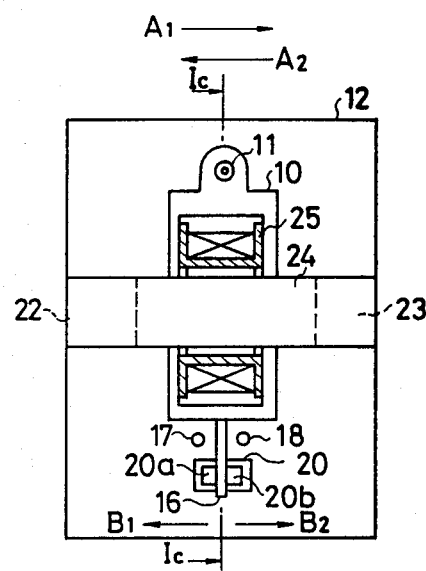
FIG. 1A is a front view showing essential parts of a first embodiment of the present invention.
Figure 1C:
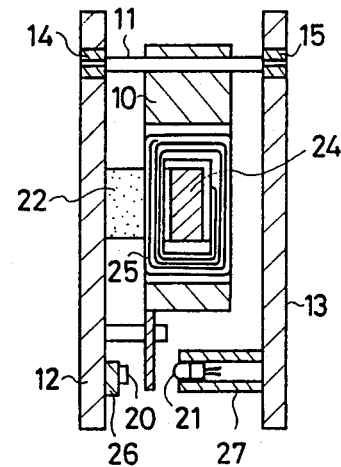
FIG. 1C is a sectional view taken along a line Ic—Ic shown in FIG. 1A.
Figure 1B:
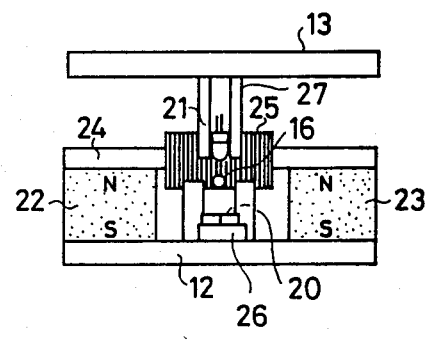
FIG. 1B is a bottom view of the first embodiment of the present invention.

Referring to FIGS. 1A through 1C, a pendulum 10 is fixed to a rotary shaft 11, which is rotatably supported by shaft bearings 14 and 15 provided in frames 12 and 13, respectively. In other words, the pendulum 10 is swung from the shaft 11. A light interrupting pin 16 is fixed to the lower part of the pendulum 10. The frames 12 and 13 are in the form of a plate. The frame 12 may be made of ferromagnetic material such as soft iron, and the frame 13 may be made of nonmagnetic material such as plastic or brass. The rotational motion of the light interrupting pin 16 is limited within a range defined by stoppers 17 and 18. For example, the range corresponds to an angle of approximately 1°.

The frames 12 and 13 are mutually fixed to each other by a column (not shown) in a state where they are spaced. A photoelectric element 20 is mounted on and fixed to a base 26 on an inner surface of the frame 12. A light-emitting element 21 is supported by projections 27 which perpendicularly extend from the inner surface of the frame 13 in such a way that it is opposite to the photoelectric element 20. A photo diode may be used as the light-emitting element 21. The light interrupting pin 16 intervenes between the light-emitting element 21 and the photoelectric element 20.

Figure 4A:
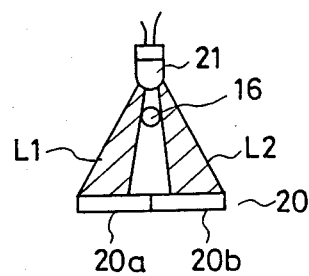
FIG. 4A is a view for explaining a function of a light interrupting pin used in the first embodiment.

The photoelectric element 20 is a single element and has two separated photoelectric parts 20a and 20b. That is, the two photoelectric parts 20a and 20b are mounted and arranged on a single base in one package. The light interrupting pin 16 is positioned at a boundary line of the two photoelectric parts 20a and 20b when the pendulum 10 is in a state where there is no acceleration. As shown in FIG. 4A, the light interrupting pin 16 partially interrupts the light emitted by the light-emitting element 21. In other words, the light interrupting pin 16 acts to limit the optical path of the light emitted by the light-emitting element 21. As shown, the light emitted by the light-emitting element 21 is divided into two hatched parts L1 and L2. The quantity of the lights L1 and L2 which are received by the photoelectric parts 20a and 20b, respectively, is adjusted so as to be the same as each other when there is no acceleration. There is a possibility that the light interrupting pin 16 would not be correctly positioned at the boundary line due to incorrect positioning of the pendulum 10 or the photoelectric element 20, even when there is no acceleration. In this case, a difference between output signals of the photoelectric parts 20a and 20b would be produced. This difference may be adjustable by suitably selecting resistances of resistors of a displacement detecting unit described in detail later.

The pendulum 10 has a hollow part in which a torquer coil 25 is wound in the form of a ring. Two permanent magnets 22 and 23 are mounted on and fixed to the inner surface of the frame 12 in a state where the S poles of the magnets 22 and 23 are in contact with the inner surface of the frame 12. The permanent magnets 22 and 23 are spaced on the frame 12. Rare earth magnets or ferrite magnets are suitable for the permanent magnets 22 and 23. A plate-shaped yoke 24 is mounted on and fixed to the surfaces on the N pole sides of the permanent magnets 22 and 23. The yoke 24 is inserted into the coil 25 in a state where it is in non-contact with the coil 25. In this state, lines of the magnetic force from the yoke 24 are directed towards the frame 12. A magnetic circuit which is constituted by the permanent magnets 22 and 23, the frame 12 and the yoke 24 constitutes a torque generating unit generally called a torquer. Preferably, the configuration shown in FIGS. 1A through 1C is accommodated in a casing (not shown) which encloses the configuration totally or partially.

Figure 2:
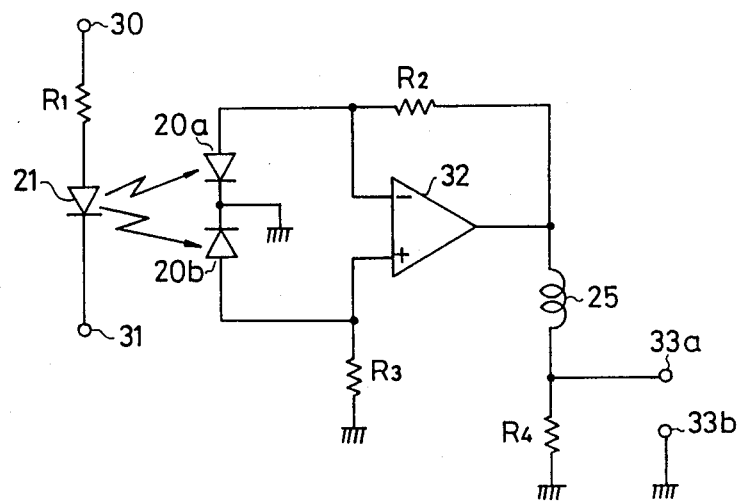
FIG. 2 is a circuit diagram of a displacement detecting unit which is one of structural elements of the first embodiment.

A description will be given on a circuit of the displacement detecting unit with reference to FIG. 2.

The cathode of the light-emitting element 21 is connected to one of terminals 31 of a power supply (not shown), and the anode thereof is connected to the other terminal 30 of the power supply through a resistor R1. The application of the power to the light-emitting element 21 causes emission thereof. The cathodes of the photoelectric parts 20a and 20b of the photoelectric element 20 are grounded. The anode of the photoelectric part 20a is connected to the inverting input of an operational amplifier 32. The anode of the photoelectric part 20b is connected to the non-inverting input of the operational amplifier 32. A resistor R2 is connected between the output and inverting input of the operational amplifier 32. A resistor R3 is connected between the ground and non-inverting input of the operational amplifier 32. The operational amplifier 32 constitutes a differential amplifier together with the resistors R2 and R3. That is, the operational amplifier 32 compares output current of the photoelectric parts 20a and 20b with each other and produces the difference therebetween. The combination of the light interrupting pin 16, the photoelectric element 20, the light-emitting element 21 and the operational amplifier 32 constitutes a displacement detecting unit for detecting the rotational displacement of the pendulum 10 corresponding to the acceleration.

An output current of the displacement detecting unit, that is, an output current of the operational amplifier 32 is passed through the torquer coil 25 and flows in a resistor R4. The output current of the operational amplifier 32 depends on the difference between the outputs of the photoelectric parts 20a and 20b. The resistor R4 is used to convert the output current into the corresponding voltage. This voltage indicating the acceleration appears across output terminals 33a and 33b.

In operation, when a positive acceleration is exerted in a direction of an arrow A1 (or A2), the light interrupting pin 16 deviates from the initial (stationary) position by an angle corresponding to the magnitude of the exerted acceleration. In response to this rotational displacement of the pendulum 10, the quantity of light received by the the photoelectric part 20b (or 20a) increases, while the quantity of light received by the other part 20a (or 20b) decreases. The difference between the lights in quantity of light is amplified by the operational amplifier 32, which produces the displacement detection signal at the output thereof. This signal flows in the torquer coil 25. Accordingly, the torque generating unit produces the torque which is exerted on the pendulum 10 in a direction such that the light interrupting pin 16 returns to the original position. Thereby, the light interrupting pin 16 (or the pendulum 10) is servo-controlled. That is, the pendulum 10 is driven to be maintained at the original position. At this time, the displacement detection signal of the amplitude corresponding to the acceleration is extracted across the output terminals 33a and 33b.

As described above, the present invention uses the single photoelectric element 20 having the two separated photoelectric parts 20a and 20b. Therefore, the photoelectric parts 20a and 20b are almost the same as each other in terms of the characteristics regarding the photo sensitivity, temperature and leakage current. For this reason, the balance adjustment such as the sensitivity adjustment and the offset adjustment of the operational amplifier 32 may become very simple. The sensitivity adjustment may be made by adjusting the resistances of the resistors R2 and R3. However, no adjustment is required for an application aimed at discriminating only whether or not the acceleration exists. Further, it should be appreciated that the acceleration detection of high accuracy is possible even in the presence of temperature variation.

Moreover, the above embodiment uses the single torque generating unit. On the other hand, the conventional accelerometer employs two sets of torque generating units as described above. Additionally, the magnetic circuit of the torque generating unit of the embodiment is composed of the plate-shaped yoke 24, the permanent magnets 22 and 23 and the frame 12 as indicated before. These features make it possible to produce compact and thin accelerometers. The compact and thin accelerometers are especially suitable for automobiles. For example, the present embodiments may be suitably applied to sensors for driving anti-lock brake systems, seat belt locking systems, air bag systems or active suspension systems.

Furthermore, the number of parts constituting the accelerometer of the embodiment is smaller than that in the conventional accelerometer. Thus, the assembly operation is less complex. In addition, the present accelerometer is very economical and reliable.

A description will be given on a second embodiment of the present invention with reference to FIGS. 3A through 3C and FIG. 4B. In these figures, the same reference numerals as those in the previous figures denote the same parts.

Figure 4B:
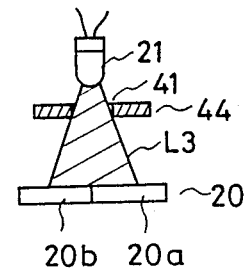
FIG. 4B is a view for explaining a function of a plate-shaped member having a slit used in the second embodiment.
Figure 3A:
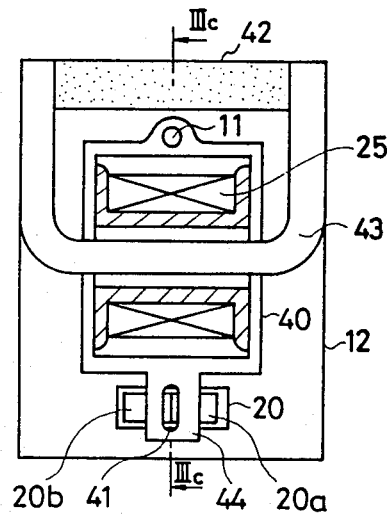
FIG. 3A is a front view for showing essential parts of a second embodiment of the present invention.
Figure 3C:
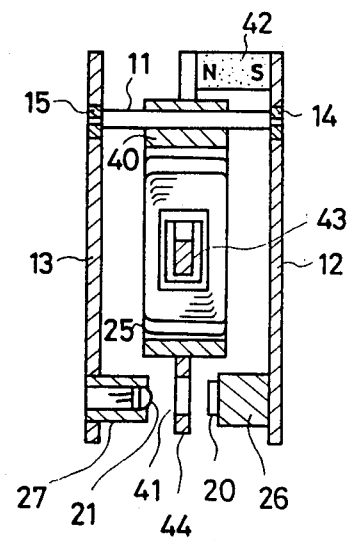
FIG. 3C is a sectional view taken along a line IIIc—IIIc shown in FIG. 3A.
Figure 3B:
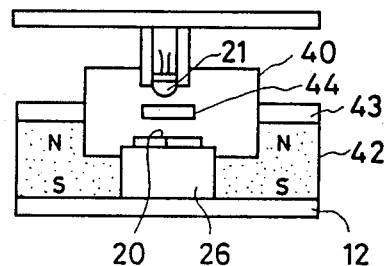
FIG. 3B is a bottom view of the second embodiment of the present invention.

Referring to FIGS. 3A through 3C, a pendulum 40 has a plate-shaped extension part 44 extending downwards from its lower part. The extension part 44 has a slit 41 having a function of limiting a light path, as shown in FIG. 4B. When there is no acceleration, light L3 emitted by the light-emitting element 21 equally projects onto the photoelectric parts 20a and 20b.

A permanent magnet 42 in the form of a block is provided on the inner surface of the frame 12 along the upper edge thereof. The S pole of the permanent magnet 42 is in contact with the inner surface of the frame 12. End parts of a U-shaped yoke 43 are mounted on and fixed to the N pole surface of the permanent magnet 42. The yoke 43 may be obtained by forming a ferromagnetic plate in the form of the U-shape. The bottom part of the U-shaped yoke 43 is inserted into the hole of the coil 25 in the non-contact state.

The other parts of the second embodiment are almost the same as those of the first embodiment. It should be appreciated that the second embodiment uses only one permanent magnet 42. Therefore, more compact accelerometers may be manufactured.

The present invention is not limited to the embodiment described above, but various variations and modifications may be made without departing from the scope of the present invention.

What is claimed is:

1. A servo type accelerometer comprising:
   a photoelectric element which is a single element and has two separated photoelectric parts;
   a light-emitting element opposite to said photoelectric element;
   frame means comprising a pair of plate-shaped frame members which are spaced and opposed to each other;
   a pendulum pivotally supported by said frame means so that said pendulum is swung between said pair of plateshaped frame members, said pendulum having an optical path limiting member for limiting an optical path of light emitted by said light-emitting element, said photoelectric element, said light-emitting element and said pendulum being positioned so that said optical path limiting member is located between said photoelectric element and said light-emitting element;
   detection means for detecting a rotational displacement of said pendulum corresponding to acceleration by use of output signals of the photoelectric parts to produce a detection signal corresponding to the rotational displacement; and
   torque generating means for generating a torque corresponding to said detection signal to drive said pendulum towards its original position,
   said torque generating means comprising a coil mounted on said pendulum, magnet means provided between said pair of plate-shaped frame members so that one pole of said magnet means is close to one plate-shaped frame member of said pair of plate-shaped frame members and the other pole of said magnet means is at a distance from said one plate-shaped frame member, and a plate-shaped yoke inserted into said coil so as to be separate from said coil, said plate-shaped yoke being coupled to said other pole of said magnet means so that lines of magnetic force are formed between said plate-shaped yoke and said one plate-shaped frame member.

2. A servo type accelerometer as claimed in claim 1, wherein said optical path limiting member is a pin which extends from a lower part of said pendulum and partially interrupts the light emitted by said light-emitting element.

3. A servo type accelerometer as claimed in claim 2, wherein when no acceleration is exerted, said pin is positioned at a boundary line of said two photoelectric parts.

4. A servo type accelerometer as claimed in claim 1, wherein said optical path limiting member is a plate-shaped member having a slit through which the light emitted by said light-emitting element is passed.

5. A servo type accelerometer as claimed in claim 4, wherein when there is no acceleration, a center of said slit is positioned at a boundary line of said two photoelectric parts.

6. A servo type accelerometer as claimed in claim 1, wherein said magnet means comprises two permanent magnets which are positioned at both ends of said plate-shaped yoke and mounted on said one plate-shaped frame member.

7. A servo type accelerometer as claimed in claim 6, wherein said one plate-shaped frame member is made of ferromagnetic material.

8. A servo type accelerometer as claimed in claim 6, wherein S poles of said permanent magnets are on a side of said one plate-shaped frame member.

9. A servo type accelerometer as claimed in claim 1, wherein said detecting means comprises an operational amplifier, one input of which receives an output signal of one of said two photoelectric parts, and the other receives an output signal of the other photoelectric part, and in which an output signal of said operational amplifier is said detection signal.

10. A servo type accelerometer as claimed in claim 1, wherein said frame means comprises means for limiting a range within which said pendulum is movable.

11. A servo type accelerometer comprising:
   a photoelectric element which is a single element and has two separated photoelectric parts;
   a light-emitting element opposite to said photoelectric element;

a pendulum having a member for limiting an optical path of light emitted by said light-emitting element, said member being arranged between said photoelectric element and said light-emitting element, frame means for supporting said pendulum, said frame means comprising two plate-shaped frame members which are spaced, said pendulum being swung between said plate-shaped frame members, detection means for detecting a rotational displacement of said pendulum corresponding to acceleration by use of output signals of the photoelectric parts to produce a detection signal corresponding to the rotational displacement; and torque generating means for generating a torque corresponding to said detection signal to drive said pendulum towards its original position, said torque generating means comprising a coil provided in said pendulum, a U-shaped yoke inserted into said coil in a non-contact state, and a permanent magnet of a block shape which is mounted on one plate-shaped frame member of said plate-shaped frame members, two ends of said U-shaped yoke being mounted on said permanent magnet.

12. A servo type accelerometer as claimed in claim 11, wherein said permanent magnet is arranged along a periphery of said one plate-shaped frame member.

13. A servo type accelerometer as claimed in claim 11, wherein the S pole of said permanent magnet is on a side of said one plate-shaped frame member.

14. A servo type accelerometer as claimed in claim 11, wherein said one plate-shaped frame member is made of ferromagnetic material.

* * * * *